Dec. 7, 1937.  F. W. WILKENING  2,101,120
PISTON RING
Original Filed Jan. 12, 1933
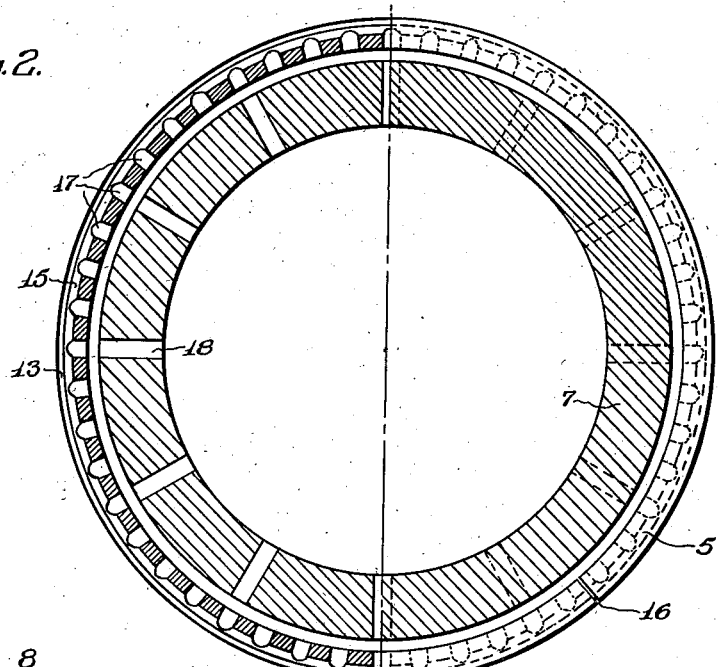
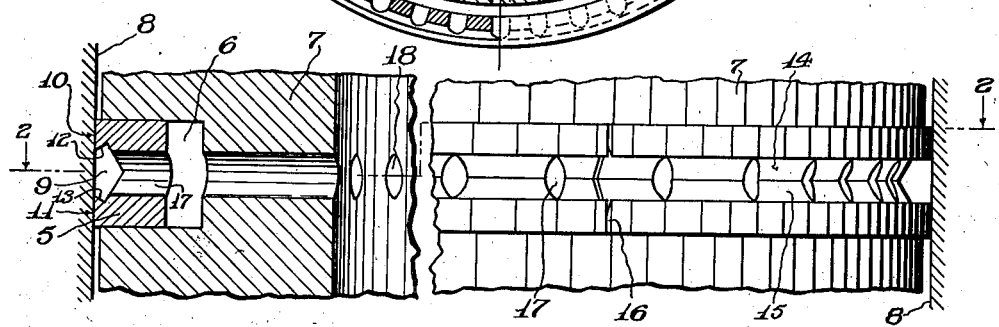
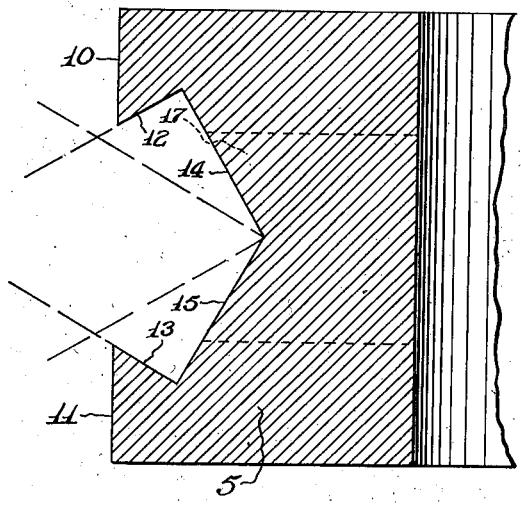
Inventor
FREDERICK W. WILKENING.
By Leonard L. Kalish
Attorney Patented Dec. 7, 1937

2,101,120

UNITED STATES PATENT OFFICE 2,101,120

PISTON RING

Frederick W. Wilkening, Narberth, Pa., assignor to Wilkening Manufacturing Company, Philadelphia, Pa., a corporation of Delaware Application January 12, 1933, Serial No. 651,327
Renewed December 12, 1935

3 Claims. (Cl. 309—45)

My invention relates to certain new and useful improvements in oil-control rings, and it relates more particularly to self-tensioned oil-control rings adapted generally for use as original installations in new engines as distinguished from auxiliary spring-tensioned oil-control rings adapted for "replacement" purposes in used and worn engines, although if still greater contact pressure is desired between piston ring and cylinder wall, the piston ring may be supplemented by a radially acting expander spring of any suitable form, the radial pressure of which will augment the tension inherent in the body of the ring. One of the objects of my present invention is to create a relatively large oil-gathering and oil-draining capacity by means of a ring construction adapted to fit within the limits of the usual or conventional ring-receiving grooves (that is, ring-receiving grooves of the usual axial widths of one-eighth; five-thirty-seconds; three-sixteenths; one-quarter inch, and having the corresponding radial depth) which will combine a large oil gathering and retaining capacity with a high radial pressure per unit of area without the aid of auxiliary expansion springs, and which will maintain said high unit of radial pressure as well as said high oil gathering and retaining capacity throughout the life of the ring, and which, at the same time, will be generally free of any distortional or twisting tendency.

Thus, I have found in modern high speed internal combustion engines, particularly of the type used in automobiles, wherein very large speed ranges must be covered, one of the principal difficulties encountered is that the effectiveness of the piston ring or piston rings both with respect to compression as well as with respect to oil control, varies within wide ranges for low, medium, and high engine speeds, and one of the objects of my present invention is more nearly to maintain the effectiveness of the ring throughout the entire speed range of the engine.

With the above and other objects in view, which will appear more fully from the following detailed description, the present invention consists of a piston ring, having a pair of spaced and generally equal and opposite, outer peripheral, cylindrical cylinder-contact surfaces and a channel intermediate the same, said channel having a pair of outer walls which converge towards each other (radially) outwardly, and a pair of inner walls which converge towards each other (radially) inwardly.

The present invention further consists in so arranging and proportioning the outer channel with respect to the opposite cylindrical cylinder-contact surfaces and with respect to the radial depth of the ring, as to maintain the desired high unit of radial pressure with a relatively high oil gathering and retaining capacity without weakening the ring or rendering the ring fragile, and without in any way increasing the difficulty or hazards of installation wherein the ring must be spread open to fully embrace the entire piston diameter.

The present invention further consists of other novel features of construction which will appear more fully from the following detailed description.

For the purpose of illustrating the present invention there is shown in the accompanying drawing one form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring to the drawing, in which like reference characters indicate like parts:

Figure 1 represents a front elevational view of a piston ring embodying the present invention, with the central part broken away, and with a portion shown in section;

Figure 2 represents a top plan view of the ring, partly in section, taken generally on line 2—2 of Figure 1;

Figure 3 represents a fragmentary sectional view of a piston ring much enlarged to show more clearly the relation between the various elements thereof.

The ring represented generally by the numeral 5, is of generally rectangular cross-section and is adapted to fit into a generally rectangular shaped ring-receiving groove 6 (of conventional widths and depths) of any piston 7, adapted to reciprocate within the cylinder wall 8 of an internal combustion engine, pump, or the like.

The outer annular channel 9 is formed in the outer periphery of the piston ring 5, with its axial width at its mouth (that is, at its outermost diameter which is directly adjacent to the cylinder wall) occupying at least one-third of the total axial width of the ring and being more nearly one-half of such axial width, thereby leaving a pair of similar and spaced cylindrical cylinder-contact surfaces 10 and 11 on either side of said channel 9; the axial width of each of which surfaces is generally less than the axial width of the mouth of said channel, and more nearly approximates one-half of the axial width of said channel. The outer walls 12 and 13 of the channel 9 incline towards each other outwardly, while the inner walls 14 and 15 of said channel 9 may incline towards each other inwardly. The depth of the channel 9 on the other hand, is generally limited to approximately one-half of the radial depth of the cross-section of the ring, or to somewhat less than one-half of such radial depth.

By reason of the relatively wide mouth opening of the channel as compared to the axial widths of the cylindrical cylinder contact surfaces on either side thereof, and by means of the general relative proportion of the depth of the channel with respect to the cross-section of the ring, and the inward enlargement of such channel, a high oil-gathering and oil-retaining capacity is produced in combination with a high unit of radial pressure between the cylinder-contact surfaces and the cylinder, so that the ring may penetrate the oil film on the cylinder wall to a greater depth at even high speeds, while the channel will gather and retain the oil;—delivering the overflow back into the crank-case through the drain apertures through the piston wall while maintaining an annular pool of oil or ring of oil in contact with the cylinder wall, thereby also to augment the seal between piston and cylinder.

Thus, also by reason of the relatively great distance between one peripheral edge of the channel and the other peripheral edge thereof (and also by reason of the relationship between the radial depth of the channel and the cross-section of the ring), not only is the unit of radial pressure between the cylinder contact surface and the cylinder increased, but the time interval between the traverse of one of said peripheral edges of the channel and the other of said peripheral edges of the channel over the same part of the oil film, is also increased relatively for any given speed, so as to afford a sufficient time interval for a portion of the oil film on the cylinder to leave the rest of the film on the cylinder and to enter the channel.

The inclination of the outer walls 12 and 13 may be such as to produce a diminution in the area of the outer cylinder-contact surfaces 10 and 11, as the piston ring wears along its outer periphery, generally in the same proportion as the outward radial tension of the ring decreases with use and wear due to the reduction in cross-sectional area and the expansion of the ring;—thereby to maintain a generally uniform outward radial pressure per unit of contact surface, throughout the life of the piston ring.

The piston ring is split at any suitable point, as for instance at 16, and the ring is tensioned outwardly, so that it will tend to expand radially of its own tension. This tension is set into the piston ring by splitting the ring, then expanding the ring to the desired extent by suitable forces (preferably tangential forces applied to the split ends), and heating the ring while in the expanded condition, thereby to set the ring in the expanded condition, so that upon a collapse of the ring to a circular shape, the ring will exert a uniformly distributed outward radial tension throughout its periphery.

The inner walls 14 and 15 of the annular channel 9 converge towards each other at a suitable angle, whereby the oil which is scraped into the channel 9 as a result of the piston ring travelling over a film of oil in the cylinder wall at a high speed, is deflected by the walls 14 and 15 towards the center of the ring, that is, towards the innermost central portion of the channel 9. Thus, the radially transverse thickness of the ring is preferably least at the center of its cross-section, where the two inner walls 14 and 15 meet.

A series of round radial apertures 17 are provided radially through the ring for the passage of oil from the channel 9 to the space in the ring-receiving groove 6 behind the piston ring.

When the piston ring of the present invention is used for oil control, it is placed into a ring-receiving groove which is provided with holes 18 drilled through the wall of the piston 7, through which the oil is drained back into the crank-case.

If desired, two or more rings 5 of the present invention may be used on each piston, that is, one in each of the several ring-receiving grooves of the piston. Thus, in pistons having two, three, four or more ring-receiving grooves, two or more rings of the present invention may be employed, preferably in the lowermost ring-receiving grooves.

The piston ring 5 will also effectively seal against pressure and against the blow-by of gases, and will effectively control the oil. It may be made to maintain a relatively constant or uniform outward radial pressure per unit of contact surface throughout its life. As stated, one of the objects of the present invention is to obtain a high unit of contact pressure between the cylinder-contact surfaces of the ring and the cylinder wall, and particularly at the inner acute scraping edges of the groove. This is accomplished, as shown, by making the cylinder-contact surfaces 10 and 12 relatively narrow in an axial direction as compared with the width of the ring. The more the widths of these cylinder-contact surfaces 10 and 11 are reduced and the mouth of the groove 9 therebetween correspondingly widened, the greater the unit contact pressure between the cylinder-contact surfaces 10 and 11 and the cylinder wall.

The invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what is hereby claimed as new and desired to be secured by Letters Patent, is:

1. A piston ring comprising a generally annular body interrupted at one point to permit radial expansion thereof, a pair of opposed and substantially equal and spaced cylindrical cylinder-contact surfaces along the outer periphery of the piston ring, a generally annular outer groove intermediate said two cylindrical cylinder-contact surfaces of a maximum radial depth not substantially greater than one-half of the overall radial thickness of the cross section of the ring, and having outwardly converging conical walls forming with said cylindrical cylinder-contact surfaces opposed and generally equal acute oil-scooping edges spaced from each other at a distance substantially greater than the axial width of each of said two cylindrical cylinder-contact surfaces and more or less the same as the combined axial widths of the same, and a series of circumferentially distributed generally radial apertures extending through the piston ring from said annular groove to the inner periphery thereof generally in the median plane of the ring at a right angle to the axis thereof.

2. A piston ring comprising a generally annular body interrupted at one point to permit radial expansion thereof, a pair of opposed and substantially equal and spaced cylindrical cylinder-contact surfaces along the outer periphery of the piston ring, a generally annular outer groove intermediate said two cylindrical cylinder-contact surfaces of a maximum radial depth not substantially greater than one-half of the over-all radial thickness of the cross section of the ring, and having its maximum radial depth substantially at its axially central plane and having outwardly converging conical walls forming with said cylindrical cylinder-contact surfaces opposed and generally acute oil scooping edges spaced from each other at a distance substantially greater than the axial width of each of said two cylindrical cylinder-contact surfaces and more or less the same as the combined axial width of the same, and a series of circumferentially distributed generally radial apertures extending through the piston ring from said annular groove to the inner periphery thereof generally in the median plane of the ring at a right angle to the axis thereof.

3. A piston ring comprising a generally annular body interrupted at one point to permit radial expansion thereof, a pair of opposed and substantially equal and spaced cylindrical cylinder-contact surfaces along the outer periphery of the piston ring, a generally annular outer groove intermediate said two cylindrical cylinder-contact surfaces of a maximum radial depth not substantially greater than one-half of the over-all radial thickness of the cross-section of the ring, and having outwardly converging conical walls forming with said cylindrical cylinder-contact surfaces opposed and generally equal acute oil-scooping edges spaced from each other at a distance substantially greater than the axial width of each of said two cylindrical cylinder-contact surfaces and not substantially less than approximately the combined axial widths of the same, said groove having a generally trough-shaped bottom and a series of circumferentially distributed generally radial apertures extending through the piston ring from said annular groove through the inner periphery thereof generally in the median plane of the ring at generally a right angle to the axis thereof.

FREDERICK W. WILKENING.